United States Patent
Oh et al.

[11] Patent Number: 6,128,032
[45] Date of Patent: Oct. 3, 2000

[54] METHOD FOR SCROLLING A VIDEO SIGNAL IN AN INTERNET SET TOP BOX

[75] Inventors: Young-Gyu Oh; Se-Yong Ro, both of Kyunggido, Rep. of Korea

[73] Assignee: LG Electronics Inc., Seoul, Rep. of Korea

[21] Appl. No.: 09/127,055

[22] Filed: Jul. 31, 1998

[30] Foreign Application Priority Data

Jul. 31, 1997 [KR] Rep. of Korea .................. 97-37438

[51] Int. Cl.[7] .................................. H04N 7/10
[52] U.S. Cl. .................. 348/10; 455/6.2; 345/327
[58] Field of Search ................... 348/10, 12, 6, 348/7, 447, 441, 446, 553, 556; 345/123, 327; 455/6.2

[56] References Cited

U.S. PATENT DOCUMENTS

| | | | |
|---|---|---|---|
| 5,608,423 | 3/1997 | Leach | 345/123 |
| 5,761,606 | 6/1998 | Wolzien | 455/6.2 |
| 5,774,664 | 6/1998 | Hidary et al. | 348/12 |
| 5,781,241 | 7/1998 | Donovan | 348/441 |
| 5,920,354 | 7/1999 | Fedele | 348/556 |
| 5,936,675 | 8/1999 | Zhang | 348/446 |
| 5,963,262 | 10/1999 | Ke et al. | 348/447 |
| 5,990,969 | 11/1999 | Bril | 348/553 |

*Primary Examiner*—Victor R. Kostak

[57] ABSTRACT

The present invention relates to an video displaying apparatus for an internet set top box, which has a video memory for storing pixel data corresponding to a scanning line of a TV signal, and a method for scrolling screen fast. The video displaying apparatus comprises a memory; a data processor for converting a received video signal into pixel data and storing the pixel data in the memory; four FIFO memories for temporarily storing pixel data of a scanning line of a TV signal from the memory; a MUX for sequentially selecting the FIFO memories one by one and outputting the pixel data from the selected FIFO memory; an RGB converter for converting the pixel data through the MUX into RGB signals, a Y/C converter for converting the RGB signals into composite analog signal consisting of luminance and chrominance signals; and a controller for controlling the data movement from the memory to the FIFO memories and output selection of the MUX. The fast screen scrolling method, which utilizes a address table containing the start addresses pointing each scanning line data stored in the memory and selects a start address to be read out first in the address table sequentially and circularly, thereby enabling a minimum data to be moved in the memory, so that fast scrolling on a screen is achieved.

4 Claims, 4 Drawing Sheets

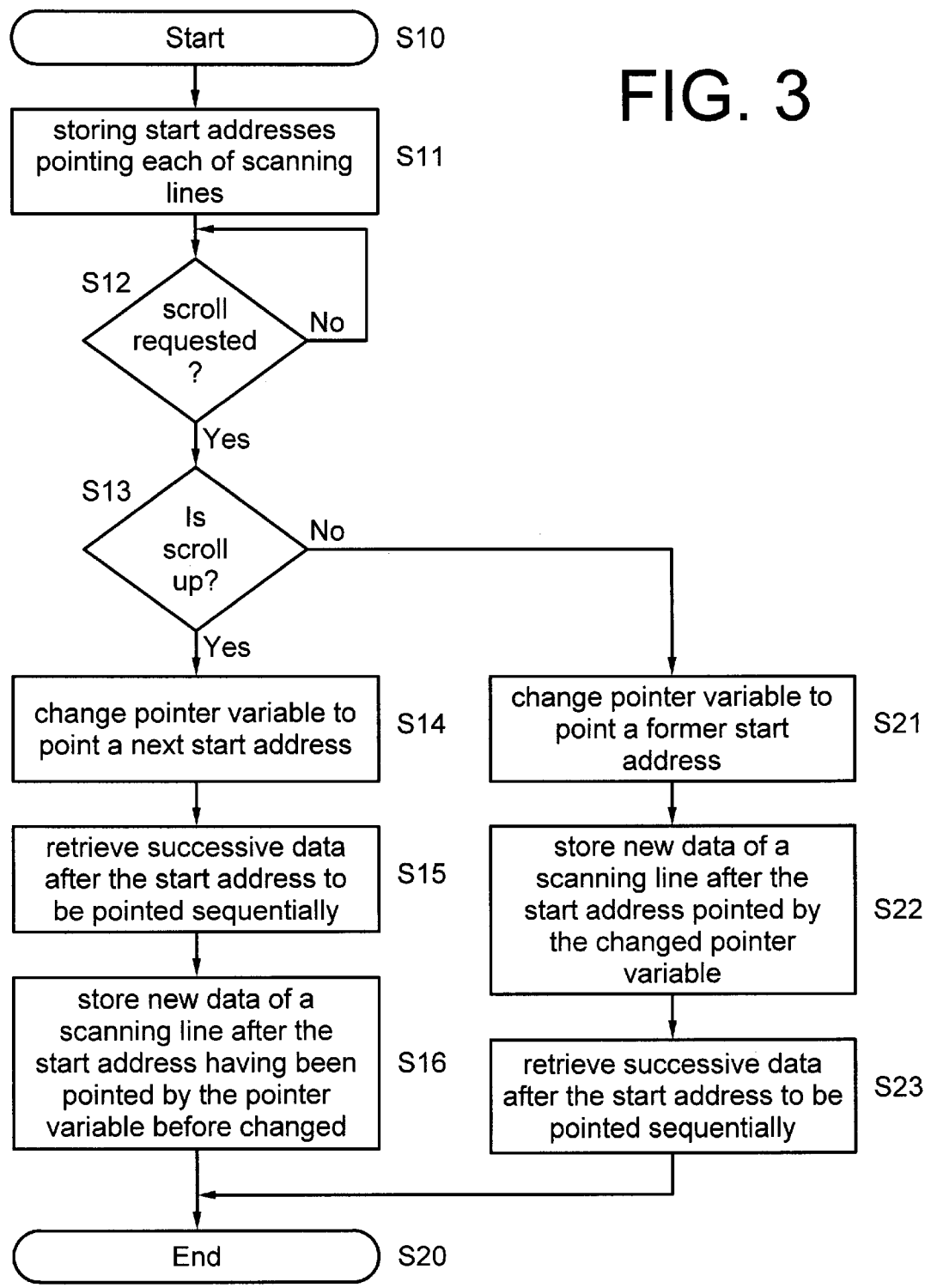

METHOD FOR SCROLLING A VIDEO SIGNAL IN AN INTERNET SET TOP BOX

BACKGROUND OF THE INVENTION

1. Field of the Invention

The present invention relates generally to a video displaying apparatus and a fast screen scrolling method for an internet set top box, and more particularly, to an apparatus that minimizes the need for equipped with the memory capacity for storing data to be displayed onto a monitor, and to a method for preparing a pointer address table in the memory. The pointer address table includes start addresses pointing to the start each of scanning lines of TV signal, and a pointer to be read out first in the pointer address table is selected sequentially and circularly, which results in minimum data movement within the memory in screen scrolling up or down mode.

2. Brief Description of the Prior Art

As the internet communication has become prevalent and the number of people using the internet has increased, the development of TV sets capable of connecting to the internet, so called an internet TV, has been launched and some products are already commercially available in the market. Besides having the features of a conventional TV the internet TV can function as a set top box-type internet terminal.

These conventional internet set top boxes employ VGA cards, used commonly in PCs, for displaying information received from the internet on a TV screen. The video displaying apparatus for conventional internet set top boxes comprises, as shown in FIG. 1, a video memory 60 for storing pixel data to be outputted and displayed on a TV screen, a graphic controller 10 for controlling input/output of the video memory 60, and a video signal converter 70 for converting the pixel data outputted from the graphic controller 10 to RGB signals.

In the conventional internet set top boxes, video information corresponding to the size of the video memory 60, for example 256 KB (=64K×4), is transferred to the graphic controller 10 and then is converted into pixel data and stored in the video memory 60. Under the control of the graphic controller 10, the stored pixel data are sequentially read out and transmitted to the video signal converter 70, wherein the pixel data are converted into RGB signals. The RGB signals are then converted to TV video signals, i.e., a composite video signal, and finally displayed on a TV screen.

As mentioned above, to process signals, the video conventional internet set top boxes employs a VGA card originally developed for PCs. The VGA cards usually require a video memory capacity of more than 256 KBytes adapting for video data. However, the video memory capacity needed for displaying video images on a TV screen is much smaller than that of the VGA card, which is designed for still image of high resolution. This is because a TV screen has lower resolution than a computer monitor. Also since a TV signal represents a seris of pictures, it is not necessary for the memory to be capable of storing video data corresponding to a full screen. Thus, the use of the VGA card unnecessarily increases the production cost.

SUMMARY OF THE INVENTION

It is therefore a primary object of the present invention to provide a video displaying apparatus for an internet set top box, having a video memory with capacity to store only the video data corresponding to a scanning line of the TV signal, thereby reducing the size of the video memory required. It is another object of the present invention to provide a screen scrolling method for the video displaying apparatus, which provides fast screen scrolling even though a minimum video memory is provided.

The video displaying apparatus according to the present invention comprises data reading means for reading out pixel data corresponding to single scanning line of the TV signal from a memory storing video data received from the internet, and storing the read pixel data temporarily; synchronizing means for generating sync signals to control the timing of displaying the temporarily stored pixel data on a TV screen; and signal converting means for sequentially converting the stored pixel data read out into the TV signal, synchronized with the generated sync signals.

The screen scrolling method according to the present invention comprises the steps of changing a pointer variable on s screen scrolling request so that the pointer points to the start address of the scanning line data to be displayed first; reading out the start addresses of subsequent scanning lines sequentially and circularly while retrieving and displaying sequentially the pixel data representing each scanning line.

In the video displaying apparatus of the present invention, the data reading means reads, from the memory storing the video data received by an internet set top box, the pixel data corresponding to the first scanning line of the TV signal and stores the pixel data temporarily. At the end of a vertical sync signal generated by the synchronizing means, the stored pixel data are sequentially converted into the TV signal by the signal converting means and displayed on a TV screen. When displaying the pixel data for the first scanning line finishes, the data reading means reads and stores the pixel data corresponding to the second scanning line, and the signal converting means again converts and displays the pixel data. The procedure is conducted repeatedly until the last scanning line is outputted and displayed on the TV screen.

In the screen scrolling method according to the present invention, a start memory address of each scanning line containing pixel data stored and a pointer variable for pointing the start position are kept in the address table. The start address pointed by the pointer variable is the first address of a scanning line data to be displayed first. When screen scrolling is received, the pointer variable is updated so that it points to the start address of the pixel data corresponding to a new first scanning line. Then, the subsequent start addresses, which succeed the updated start address in the address table, are read out sequentially and circularly. The pixel data representing each of scanning lines are read out referring to the respective start addresses and displayed on the TV screen. As a result, fast screen scrolling with no video data movement within the memory is achieved.

The above objects, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings:

FIG. 3 is a flow chart of the screen scrolling method for an internet set top box according to the embodiment of present invention.

DETAILED DESCRIPTION OF THE PREFERRED EMBODIMENTS

The preferred embodiment of the present invention will be described below in detail referring to the accompanying drawings.

Figure 1:
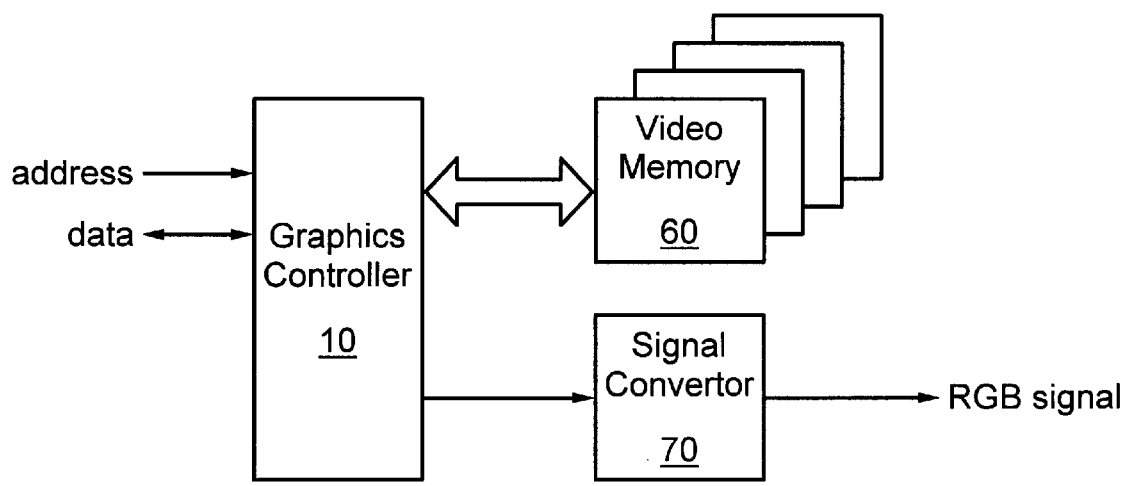
FIG. 1 is a block diagram of a video displaying apparatus for conventional internet set top boxes.
Figure 2:
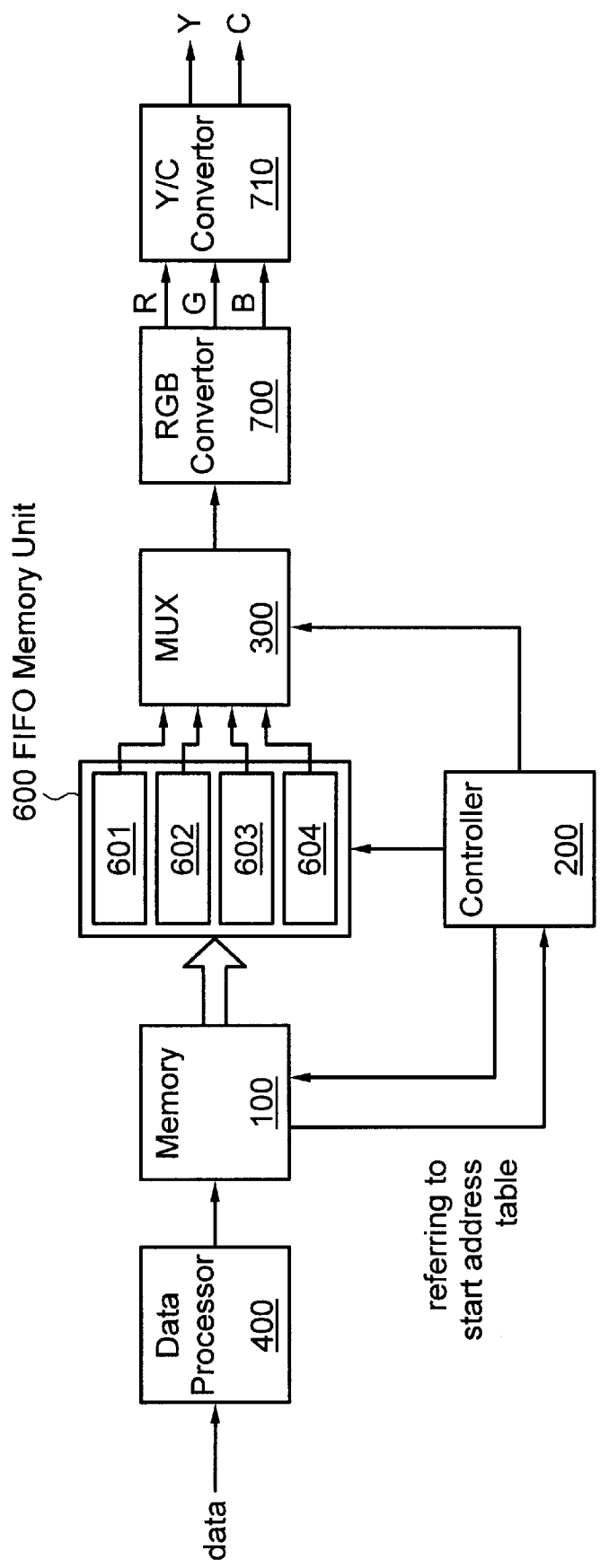
FIG. 2 is a block diagram of a video displaying apparatus for an internet set top box of an embodiment of the present invention.

FIG. 2 shows a block diagram of a video displaying apparatus for an internet set top box embodying the present invention, wherein the numeral 100 denotes a memory, numeral 400 denotes a data processor for converting received video information into pixel data and storing the pixel data in the memory 100, numeral 600 denotes a FIFO memory unit composed of four FIFO memories 601 to 604 for temporarily storing pixel data corresponding to single scanning line of a TV signal respectively, numeral 300 denotes a MUX for sequentially selecting one of the FIFO memories 601 to 604 and outputting the pixel data from the selected FIFO memory, numeral 700 denotes an RGB converter for converting the pixel data outputted from the MUX 300 into RGB signals, numeral 710 denotes a Y/C converter for converting the RGB signals into a composite video signal composed of luminance and chrominance (Y/C) signals, and numeral 200 denotes a controller for controlling the data movement from the memory 100 to the FIFO memory unit 600 and selection of data path in the MUX 300, based on sync signals being generated in itself.

FIG. 3 is a flow chart showing the fast screen scrolling method for an internet set top box according to the embodiment of the present invention. Hereinafter, the preferred embodiment of the video displaying apparatus for an internet set top box according to the present invention will be explained referring to each of steps FIG. 3.

The data processor 400 converts the information received from the internet into pixel data streams and stores them in the memory 100. In addition, it divides the pixel data streams into respective scanning lines, and makes an address table to store the start address of each pixel data group corresponding a single scanning video line (S11). Referring to the address table, after a vertical sync signal, the controller 200 begins to read out a pixel data group by group from the memory 100 and transfers the pixel data group into the FIFO memories 601 to 604, each FIFO having a capacity of 640 bytes. The pixel data are read out 32 bits at a time and the 32-bit pixel data are distributed into the four FIFO memories 601 to 604 having 8-bit data I/O lines in parallel.

The pixel data distributed and stored in the FIFO memories 601 to 604 are transmitted to the MUX 200 and are reorganized therein as follows. One FIFO memory is selected in turn among four FIFOs 601 to 604 according to the selection control signal from the controller 200. The 8-bit pixel data are sequentially outputted from each of FIFOs 601 to 604 and are reorganized into original 32-bit data in the MUX 200 and transferred to the RGB converter 700 in 32-bit pixel data form.

The RGB converter 700 converts the received 32-bit pixel data into red, green, and blue (RGB) signals. The RGB signals are then converted into a composite video signal composed of luminance and chrominance (Y/C) signals by the Y/C converter 710 and finally displayed on a TV screen.

On screen scrolling a request (S12), it is confirmed whether scrolling up or down is requested (S13). During scroll-up, the controller 200 increments a pointer variable to point a next start address, i.e. the next scanning line, in the address table (S14). The controller 200 reads out start addresses subsequent the next start address pointed by the updated address table in a sequential and circular fashion. At the same time it retrieves pixel data stored in successive cells of memory 100 from the previous start address, and transfers them sequentially to the FIFO memory unit 600.

Following the aforementioned distribution, reorganization, and video displaying procedure, the pixel data streams in the FIFO memory unit 600 are displayed on the TV screen line by line (S15).

Accordingly, the image of the first scanning line is deleted on the TV screen the rest of the scanning lines are scrolled up by a line, and the last line becomes blank. The data processor 400 stores new pixel data to be displayed in the last blank line into the area of the memory 100 where the pixel data corresponding to the first scanning line were stored before scroll-up. Following the aforementioned video displaying procedure, the new pixel data are displayed in the last line (S16), thereby completing the scroll-up process with the minimum data movement.

During of scroll-down, under the control of controller 200, the data processor 400 stores new pixel data, to be displayed in the first line, in the area of the memory 100 where the pixel data corresponding to the last scanning line before scroll-down were stored (S22). The controller 200 updates the pointer variable to point to a previous start address, which points to the last scanning line that precedes the first line circularly, in the address table. After the scanning line data following the previous start address are stored, the controller 200 reads out other previous start addresses from the address table in a sequential and circular fashion. At the same time, it retrieves pixel data stored in successive cells of memory 100 from the successive start address read out just before, and transfers them sequentially to the FIFO memory unit 600.

Consequently, the scroll-down process is performed by displaying the pixel data transferred to the FIFO memory unit 600 following the aforementioned video displaying procedure (S23).

Unlike the screen scrolling method explained above wherein scrolling is performed by single scanning line, if a text line is to be scrolled, the pointer variable is incremented or decremented by the number of scanning lines corresponding to the height of a character on the screen. For example, if 25 text lines are displayed on the screen, the number of scanning lines corresponding to the height of a character is 21 (=525 scanning lines/25 text lines). To scroll up a text line, the pointer variable needs to be incremented by 21 and pixel data corresponding to 21 scanning lines need to be updated by the data processor 200.

Figure 4A:
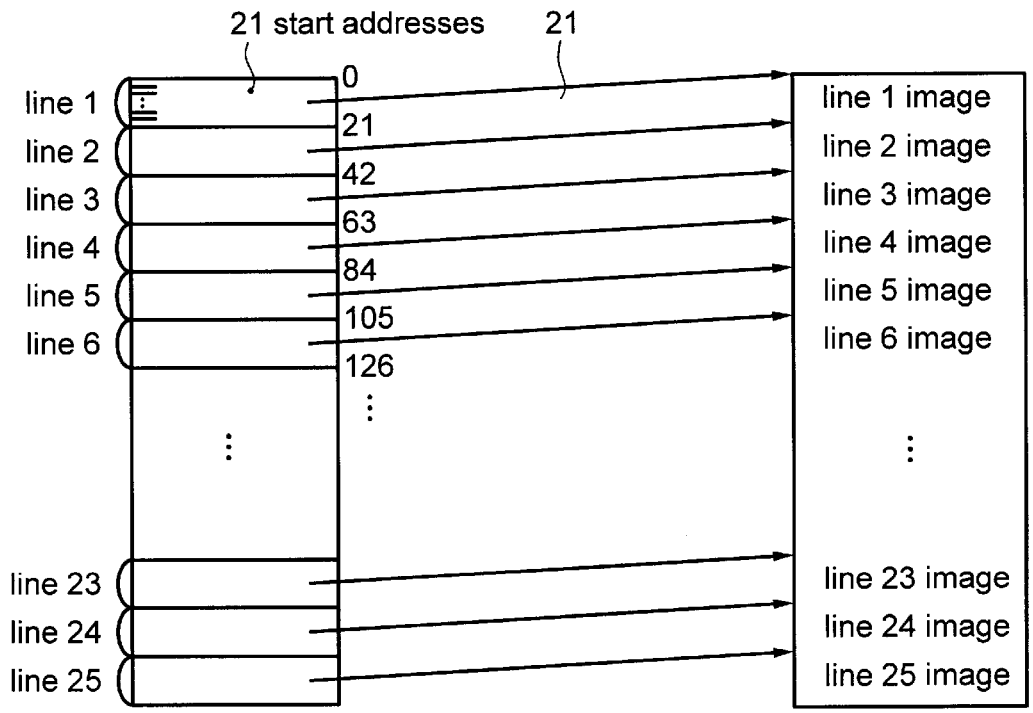
FIG. 4 is a diagram showing scrolling of a text line according to the screen scrolling method shown in FIG. 3.
Figure 4B:
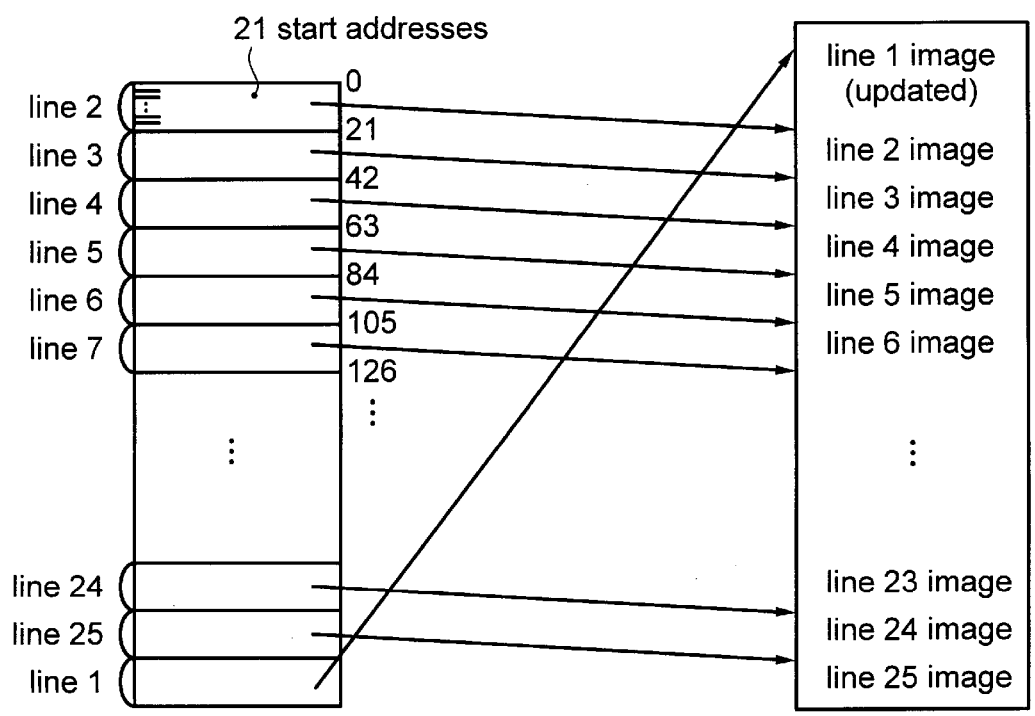

FIG. 4 is a diagram describing scroll-up of a text line, wherein the pointer variable, which pointed to the start address of text line 1 (scanning lines 0 through 20), is updated to point to the start address of text line 2 (scanning lines 21 through 41). The pixel data contained in the correspondent scanning lines 21 through 41 are outputted sequentially, starting from the start address pointed newly by the pointer variable, the area of the memory corresponding to text 1, is loaded with new pixel data, and the new pixel data are displayed last, thereby performing scroll-up of a text line.

The invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for scrolling a video signal fast in an internet set top box when screen scrolling is requested, comprising:

changing a pointer pointing a start address of pixel data to be displayed in the first scanning line on the screen; and reading out the start addresses of each scanning line data sequentially and circularly, whenever the successive pixel data corresponding to one scanning line starting from the start address just previously read out are retrieved completely to a plurality of line memory FIFOs.

2. A method according to claim 1, wherein the pointer pointing a start address of one scanning line is changed to point to a new start address of another scanning line, said other scanning line being apart from said one scanning line a distance corresponding to the height of a character.

3. A method for scrolling a video signal fast in an internet set top box when screen scrolling up is requested, comprising:

changing a pointer to point a second start address of pixel data that is to be displayed in the first scanning line on the screen; and updating the line pointed to by a first start address with new pixel data, and reading out the start addresses from the second start address sequentially and circularly while displaying the successive pixel data from the start address just previously to a plurality of line memory FIFOs being read out onto a scanning line of a TV screen.

4. A method for scrolling a video signal fast in an internet set top box when screen scrolling down is requested, comprising:

changing a pointer to point to a last start address of pixel data that is to be displayed in the first scanning line on the screen; and updating the line pointed to by the last start address with new pixel data, and reading out the start addresses from the last start address sequentially and circularly while displaying the successive pixel data from the start address just previously to a plurality of line memory FIFOs being read out onto a scanning line of a TV screen.

* * * * *